United States Patent Office 3,177,123
Patented Apr. 6, 1965

3,177,123
FUEL ROD FOR NUCLEAR REACTORS
André Huet, 48 Ave. du President Wilson, Paris, France
Filed May 9, 1960, Ser. No. 27,752
Claims priority, application France, May 13, 1959,
794,630
5 Claims. (Cl. 176—83)

It has already been proposed to use in nuclear reactors fuel rods having an axial channel. The present invention has for its object a fuel rod for reactors provided with transverse channels formed in the mass of the rod in any desired direction, and intended to provide serviceable passages in this mass, and for example, to communicate between the external surface of the rod and the internal surface of an axial channel formed in the rod. These channels provide for the passage of cooling and/or moderator fluid.

In the case of channels which communicate with an axial channel, the channels which constitute the object of the present invention are preferably of helicoidal form and can open into the axial channel tangentially to the internal surface of the axial channel in such manner as to impart a helicoidal movement to the fluid which circulates in the interior of the fuel rod.

The circulation provided by the channels which form the object of the invention supplies a means of cooling the rod according to any desired law and provides better thermal use of the reactor fuel.

If the fuel rods of the reactor in question are disposed vertically in a cooling and/or moderator liquid such as water or heavy water, the fuel rod provided with channels in accordance with the present invention acts in addition as a separator of water and steam, since the gyratory or turning movement of the water which rises in the axial channel of the rod facilitates the axial liberation of the steam which may be present. The arrangement also permits any desired superheating or re-superheating of the steam which may come from another part of the reactor.

The straight or helicoidal channels can be of either uniform or variable section and/or of any large or small number along the rod. The axial channel can be of straight cylindrical section or of frusto-conical section, so as to be adapted to the delivery of fluid circulating in the channel. Finally, the rod itself can be frusto-conical in shape instead of having a generally cylindrical shape with a circular section.

The fuel of the rod can be a metal, or oxides, or a ceramic material.

The description which follows below with reference to the attached drawings which are given by way of example only and not in any sense by way of implied limitation, will make it quite clear how the present invention may be carried into effect.

Figure 2:
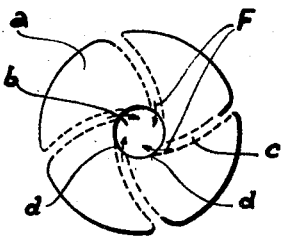
FIG. 2 is a section view of a rod according to FIG. 1, illustrating the general helicoidal arrangement of the channels at a certain height on the rod.

In a fuel rod $a$ of a nuclear reactor, which can be either of metal or formed by metallic oxides, or oxides agglomerated in a ceramic material, and comprising an axial channel $b$ of circular section, there are formed in accordance with the present invention, channels $c$, which preferably have the shape of a helix and which join together the external surface of the rod $a$ and the internal surface of the conduit $b$. The channels can run in any desired direction and have any desired length. They could be straight and simply transverse to the axis of the rod, so as to be disposed in one or a number of axial planes. It may prove preferable, however, to give them a helicoidal direction, thereby permitting the inlet orifices and especially the outlet orifice $d$ (FIG. 2) to open tangentially into the interior of the axial channel $b$, thereby to impart to the fluid which circulates in the axial channel a rotational or gyratory movement as the fluid moves in the direction denoted by the arrows F.

The channels $c$ can be of variable number according to their position on the length of the rod. As has been shown in FIG. 1, the channels slope towards the axis at a greater angle at the bottom than at the top of the rod, so as to cause the cooling action to vary along the rod. There have been shown in the drawings four channels located at the same level on the rod, but their number could also vary from one level to the other. It will be understood that, according to the choice of the number of channels, according to their orientation, and according to the dimension given to their cross section, it is possible to obtain any law of cooling desired along the rod $a$, with the object of achieving the best thermal conditions for use of the fuel.

Figure 3:
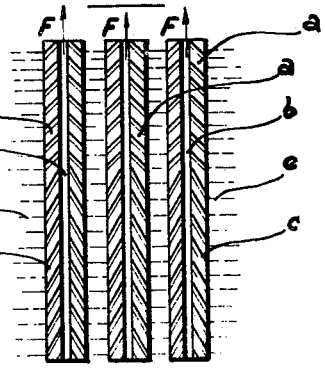
FIG. 3 is an elevation view in section of a number of rods in accordance with the invention immersed in the water of a reactor.

If the rods shown in FIG. 3 are intended to be employed, for example, in a reactor of the boiling liquid type such as water $e$, or heavy water, the water which circulates in the channels $c$ follows a gyratory movement in the interior of the channel $b$, whereby separation of the steam from the water is produced through a centrifugal effect. The steam is liberated axially in the axial direction of the conduit $b$, in which it is subsequently superheated. It can therefore be seen that the rod acts as a separator of water from steam and subsequently as a superheater.

The rods which form the object of the present invention, can be employed in combination with channels or sheathing envelopes having undulations or passages for the cooling fluid.

Figure 1:
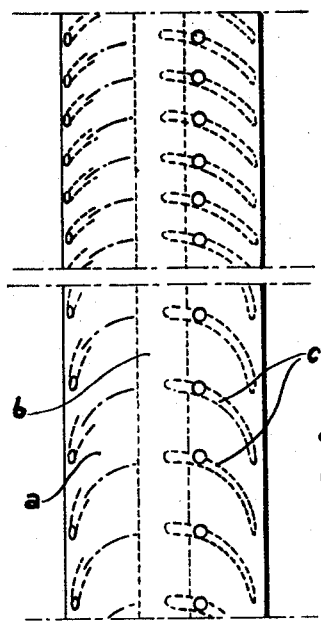
FIG. 1 is a fragmentary sectional elevation view of a fuel rod in which channels forming the object of the present invention have been formed.
Figure 4:
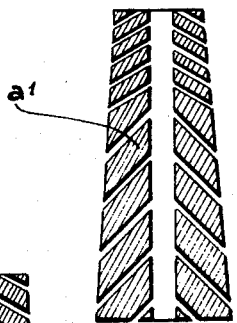
FIG. 4 is an elevation view in section of an alternative form of a rod according to the invention and having a frusto-conical shape, with a cylindrical axial conduit.
Figure 5:
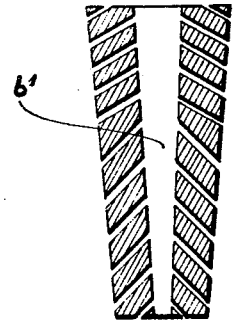
FIG. 5 is an elevation view in section of another alternative form of the rod of frusto-conical shape which is flared from the bottom towards the top, with an axial channel also of frusto-conical shape.
Figure 6:
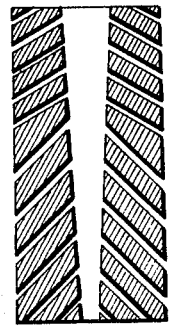
FIG. 6 is an elevation view in section of still another fuel rod, according to the invention.

The axial channel of the rod, instead of being cylindrical of circular section as shown in FIG. 1, could also be frusto-conical as illustrated in FIG. 6. The rod itself can also be frusto-conical as has been shown at $a^1$, in FIG. 4, with an axial conduit having a cylindrical shape, the large base of the cone frustum being located at the bottom. Alternatively, as illustrated in FIG. 5, the rod of frusto-conical shape can have its large base directed upwards, in combination with an axial conduit $b^1$ also having a frusto-conical shape.

What I claim is:

1. A tubular fuel element for a nuclear reactor with fluid cooling, said tubular element being defined by a tube having a solid unitary body defining an outer wall and an inner wall and said body being formed with helicoidal channels of circular cross-section defined in said body of the tube itself and extending from the outer wall to the inner wall, said channels opening tangentially to the inner wall.

2. A tubular fuel element for a nuclear reactor with fluid cooling, said tubular element being defined by a tube having a solid unitary body defining an outer wall and an inner wall and said body being formed with helicoidal channels of circular cross-section defined in said body of the tube itself and extending from the outer wall to the inner wall, said channels opening tangentially to the inner wall and the channels varying in number and in pitch along the length of the tube.

3. A tubular fuel element for a nuclear reactor with fluid cooling, said tubular element being defined by a tube having a solid unitary body defining an outer wall and an inner wall and said body being formed with helicoidal channels of circular cross-section defined in said body of the tube itself and extending from the outer wall to the inner wall, said outer wall being frusto-conical and said inner wall being cylindrical and said channels opening tangentially to the inner wall.

4. A tubular fuel element for a nuclear reactor with fluid cooling, said tubular element being defined by a tube having a solid unitary body defining an outer wall and an inner wall and said body being formed with helicoidal channels of circular cross-section defined in said body of the tube itself and extending from the outer wall to the inner wall, said outer wall being cylindrical and said inner wall being frusto-conical and said channels opening tangentially to the inner wall.

5. A tubular fuel element for a nuclear reactor with fluid cooling, said tubular element being defined by a tube having a solid unitary body defining an outer wall and an inner wall and said body being formed with helicoidal channels of circular cross-section defined in said body of the tube itself and extending from the outer wall to the inner wall, said inner and outer walls both being frusto-conical and said channels opening tangentially to the inner wall.

References Cited by the Examiner

UNITED STATES PATENTS

| 2,134,058 | 10/38 | Ris. | |
|---|---|---|---|
| 2,181,927 | 12/39 | Townsend. | |
| 2,246,329 | 6/41 | Telkes. | |
| 2,276,527 | 3/42 | Throckmorton et al. | |
| 2,799,642 | 7/57 | Hurwitz et al. | |
| 2,890,158 | 6/59 | Ohlinger et al. | 176—32 |
| 2,894,320 | 7/59 | Gurinsky et al. | 176—82 |
| 2,968,601 | 1/61 | Evans et al. | 176—73 |
| 3,028,329 | 4/62 | Mahlmeister | 176—72 |

FOREIGN PATENTS

| 220,648 | 2/59 | Australia. |
|---|---|---|
| 545,117 | 2/56 | Belgium. |
| 1,174,121 | 11/58 | France. |
| 789,257 | 1/58 | Great Britain. |
| 790,688 | 2/58 | Great Britain. |

OTHER REFERENCES

Cunningham et al.: Proceedings of the International Conference on the Peaceful Uses of Atomic Energy, vol. 9, 1955, pages 203–207. TK 9006 I5.

Glasstone: Principles of Nuclear Reactor Engineering, 1955, pages 764, 765 and 766.

CARL D. QUARFORTH, *Primary Examiner.*

WILLIAM G. WILES, OSCAR R. VERTIZ, LEON D. ROSDOL, *Examiners.*